(12) United States Patent
Wang

(10) Patent No.: US 12,205,113 B2
(45) Date of Patent: Jan. 21, 2025

(54) ACCESS NODE FOR PROVIDING NETWORK SERVICE, STORAGE CLOUD SERVICE AND GRADING OF DOCUMENTS IN SOCIAL NETWORK SYSTEM

(71) Applicant: Zhenkun Wang, Marblehead, MA (US)

(72) Inventor: Zhenkun Wang, Marblehead, MA (US)

( * ) Notice: Subject to any disclaimer, the term of this patent is extended or adjusted under 35 U.S.C. 154(b) by 244 days.

(21) Appl. No.: 17/544,251

(22) Filed: Dec. 7, 2021

(65) Prior Publication Data

US 2023/0177504 A1 Jun. 8, 2023

(51) Int. Cl.
*G06Q 20/40* (2012.01)
*H04L 9/40* (2022.01)

(52) U.S. Cl.
CPC ....... *G06Q 20/401* (2013.01); *H04L 63/0884* (2013.01); *G06Q 2220/00* (2013.01)

(58) Field of Classification Search
CPC .............. H04L 63/0272; H04L 67/568; H04N 21/6118
See application file for complete search history.

(56) References Cited

U.S. PATENT DOCUMENTS

| | | | | |
|---|---|---|---|---|
| 8,782,158 B2 * | 7/2014 | Cropper | ................ | H04L 65/403 709/206 |
| 11,108,773 B1 * | 8/2021 | Dhani Reddy | ..... | H04L 63/0272 |
| 2008/0273591 A1 * | 11/2008 | Brooks | .............. | H04N 21/6118 375/240.01 |
| 2010/0085947 A1 * | 4/2010 | Ringland | .......... | H04W 28/0226 370/338 |
| 2018/0063272 A1 * | 3/2018 | Oyama | ................. | H04L 67/568 |

\* cited by examiner

*Primary Examiner* — Saba Dagnew
(74) *Attorney, Agent, or Firm* — WPAT, PC

(57) ABSTRACT

An access device comprises a shared storage, a first network module for connecting to a wide-area network; a second network module for connecting to a user device in a local area with the access device, and a processor coupled to the first and the second network modules and for executing instructions stored in a non-volatile memory to realize following steps: having the user device connecting to a third party server via the wide-area network for making a first online financial arrangement with an electronic account of an owner of the access device, and having the user device connecting to the wide-area network or the shared storage after the first online financial arrangement is successfully done.

18 Claims, 4 Drawing Sheets

| 610 User UID | 620 Document UID | 630 Display/play Flag(s) | 640 Display/play Time Duration(s) | 650 Document Grade and Comments |
|---|---|---|---|---|
| | | | | |

ACCESS NODE FOR PROVIDING NETWORK SERVICE, STORAGE CLOUD SERVICE AND GRADING OF DOCUMENTS IN SOCIAL NETWORK SYSTEM

FIELD OF THE INVENTION

The present invention relates to network system, and more particularly, to access node for providing network service, storage cloud service and grading of documents in social network system.

BACKGROUND OF THE INVENTION

Modern life is built on an interconnected world. Access to Internet is a basic need. Information and documented transmitted and stored in a connected network. Internet is an instance of this kind of connected network. Digital data are usually accessed in a social network system consisting of people who share common interests. Because the amount of the digital data is huge, people attached to the social network system relies each other to evaluate stored documents and to recommend whether the documents are suitable for reading.

Therefore there exists a need to have an interconnected system providing flexible and multiple access options from its member elements and shared storages such that users of the social network system can grade documents and entrust evaluation results provided by other users.

SUMMARY OF THE INVENTION

An access device is provided according to the present invention. The access device comprising: a first network module, configured for connecting to a wide-area network; a second network module, configured for connecting a user device in a local area with the access device; and a processor module, coupled to the first and the second network modules and, configured for executing instructions stored in a non-volatile memory to realize following steps: having the user device connecting to a third party server via the wide-area network for making a first online financial arrangement with an electronic account of an owner of the access device; and having the user device connecting to a networked computer via the wide-area network after the first online financial arrangement is successfully done.

A system is provided according to an aspect of the present invention. The system comprising the aforementioned access device and the aforementioned user device.

The access device presented by the instant application can provide flexible network access options for nearby user devices. The provided access options may have stronger signals for more stable wireless connections, larger bandwidth, and lower prices.

In one embodiment, in order to provide fast and redundant data storage cloud service, the access device further comprises: a shared storage module, configured for storing a copy of data sent from the access device, wherein the processor module is further configured to realize following steps: sending the data to a second access device attached to the wide-area network so as a second shared storage module of the second access device is instructed for storing another copy of the data. The data may come from the access device or the user device.

In one embodiment, in order to provide a grade of a document after a user really review this document, the access device further comprises an output device and a input device coupled to the processor module, wherein the processor module is further configured to realize following steps: downloading, by the first network module, a document which contains multiple pieces from a document repository server via the wide-area network or; outputting the multiple pieces of the document by the output device and recording time durations corresponding to each of the pieces; determining whether the multiple pieces are properly reviewed according to the time durations, respectively, to assert multiple flags corresponding to the multiple pieces; determining whether the document is properly reviewed according to the multiple flags; when it is determined that the document is properly reviewed, receiving a grade of the document by the input device; and uploading, by the first network module, the grade of the document to a social network server via the wide-area network or. The output device may comprise a display device or a speaker device for visual or acoustic outputs.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
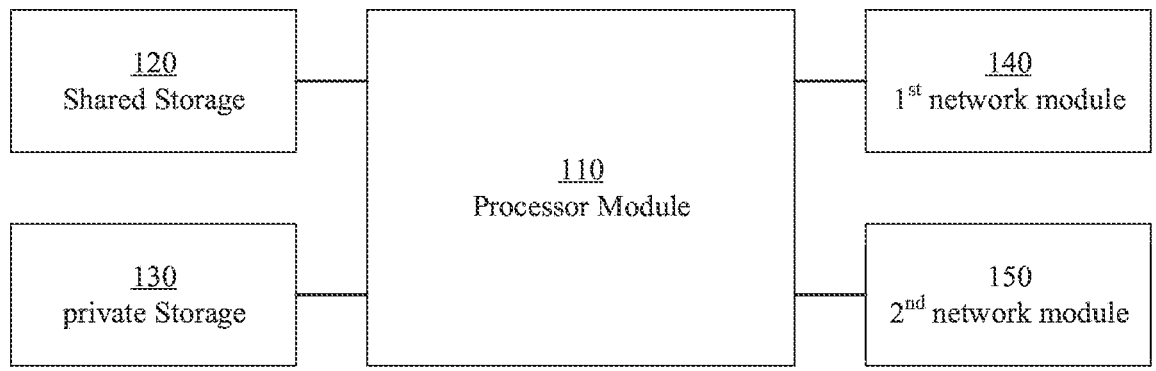
FIG. 1 illustrates an access device in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1 which illustrates an access device 100 in accordance with an embodiment of the present application. One of the functions of the access device 100 is to provide a network access portal for other user's devices. The access device 100 may be a portable electronic device using battery power such as a laptop computer, a tablet computer, a smart phone or any other kinds of computing device which may be carried by person or vehicle. Alternatively, the access device 100 may be an electronic device which uses utility as its power source. The present application does not limit which kind of power the access device 100 uses.

The access device 100 may comprise a processor module 110, a shared storage module 120, a private storage module 130, a first network module 140 and a second network module 150. The access device 100 may comprise other components which are not shown in FIG. 1. For examples, a display or an external interface of display (e.g. HDMI, VGA, or Thunderbolt), a keyboard, a touch pad, a mouse, and/or a speaker, may be included in the access device 100. The processor module 110 usually comprises a central processor unit (CPU) for executing instructions of an operating system (OS) for controlling the access device. The OS provides a executable environment for applications.

In order to provide the network access function, the first network module 140 is configured to connect to a wired or wireless wide-area network. For examples, the wireless wide area network may be a 2G, 3G, 4G, 5G or any further generation of mobile communication network. Starlink, Iridium and other kinds of satellite based communication network may be provided as the wide-area network. Alternatively, the wired wide area network may be a PSTN, an optical fiber network, ADSL network, cable network and etc. The first network module 140 may comprise MODEM, antenna, PHY and other electronic components to connect and communicate with the wide-area network.

A network service provider offers access to the wide-area network according to a fee schedule. The fee may be based on a traffic volume between the first network module 140 and the wide-area network. Or the fee may be based on a fixed periodically time, e.g. an hourly rate or a weekly rate.

In the other hand, in order to provide the network access portal to one or more nearby user devices, the second network module 150 is configured to connect to the nearby user device. The second network module 150 may be compatible to industrial wired or wireless communication standards, such as IEEE 802.3, IEEE 802.11, Bluetooth, and UWB. Usually, the user device and the access device 100 are owned by one person, one family or one company.

When the user device sends data to other device or server in the Internet, the data would be received by the second network module 150 from the user device. And the first network module 140 would forward the received data to the other device or server through the connected wide-area network. Reversely, when the other device or server sends data to the user device, the first data network module 140 would receive the data from the wide-area network. Then the second data network module 150 forwards the data to the user device.

The OS and applications as well as their data are stored in the private storage module 130. For examples, the private storage module 130 may be a non-volatile memory such as a hard drive, an EEPROM module, an optical drive and other kinds of memory. Data stored in the private storage module 130 usually are not shared to other device. Data stored in the private storage module 130 may be encrypted in order to protect data integrity and privacy of user. In one embodiment, the processor module 110 may include one or more encryption and decryption circuits to provide protections to data stored in the private storage module 130. For example, TPM (trusted platform module) is a standard crypto-processor which may be included in the processor module 110.

In addition to the private storage module 130, a shared storage module 120 is mandatory included in the access device 100. Although these two storage modules 120 and 130 shown in FIG. 1 are two different blocks, these two storage modules 120 and 130 may share one physical device (i.e., one hard drive or an EEPROM) being partitioned into two logical devices for these two modules 120 and 130, respectively. Alternatively, these two storage modules 120 and 130 may be realized by two separate devices.

Data stored in the shared storage module 120 may be accessed by a remote device, although the data may be also encrypted by the processor module 110 or encryption circuits in the shared storage module 120. In one embodiment, the physical device embodies the shared storage module 120 may be permanently installed in the access device 100 so as the data integrity and privacy can be guaranteed. For example, the EEPROM chips of the shared storage module 120 may be welded in a motherboard of the processor module 110. In another instance, the EEPROM chips of the shared storage module 120 may be encapsulated in such a manner that once the encapsulation is broken, high voltage current would be released by a capacitor installed in the encapsulation to burn out memory circuits of the shared storage module 120. There is no additional physical interface provided by the shared storage module 120. Data access of the shared storage module 120 has to be through the processor module 110 and/or the encryption circuits (such as TPM) only.

In addition to physical protection measures to the shared storage module 120, encryption circuits may be also added to the shared storage module 120 to prevent unauthorized data access. Multiple layers of data protection schemes may be used to implement on the shared storage module 120 to protect confidentiality of data. Access management of the shared storage module 120 may be implemented by a shared storage server in a remote site and/or a distributed agent installed in and executed at every access device 100. In short, the access node 100 is designed to prevent its user from directly accessing the shared storage module 120 except through a cloud storage service. The present application would elaborate further details below.

Figure 2:
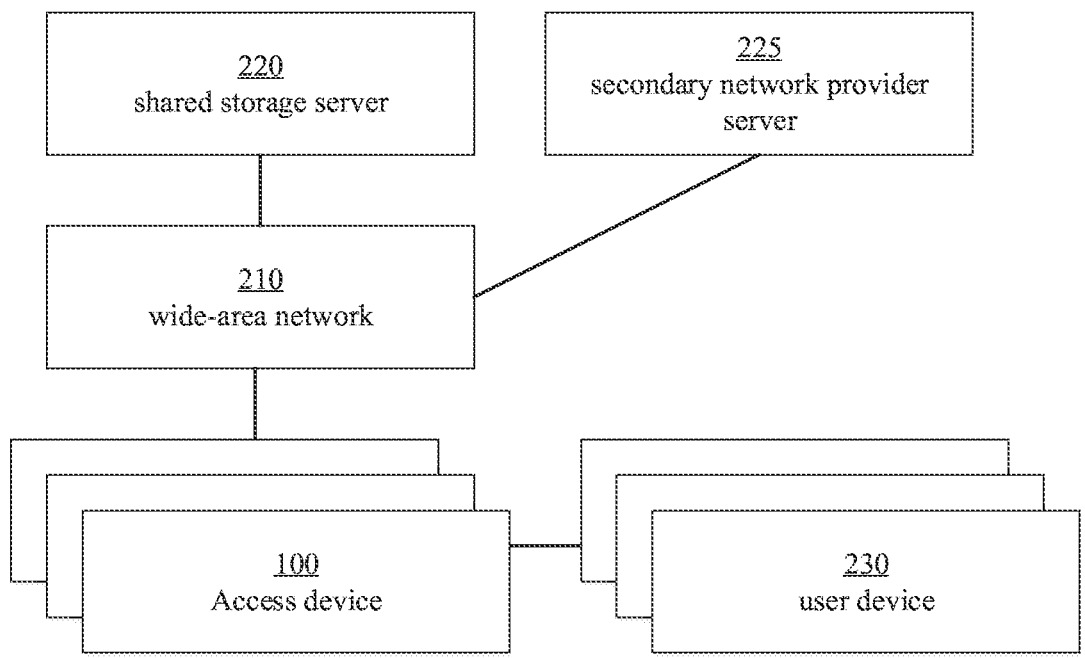
FIG. 2 depicts a network system in accordance with an embodiment of the present application.

Please refer to FIG. 2, which depicts a network system 200 in accordance with an embodiment of the present application. The network system 200 comprises a wide-area network 210 and a plurality of access devices 100. Each of the access nodes 100 connects to the wide-area network 210 via its first network module 140. The wide-area network 210 may be used to connect to other networks to be a part of the Internet. An entity or a company so-called Internet Service Provider (ISP) usually provides connectivity of the wide-area network 210 and the access node 100 to its customers, i.e., users or subscribers. A user may rent or buy the access device 100 from the ISP in order to connect to the wide-area network 210. A user may have one or more user devices 230 such as personal computers, tablet computers, smart phones, smart televisions or set top boxes to access the wide-area network 210 via the second network module 150 of the nearby access devices 100. The ISP may charge the user by counting a traffic volume involving the access node 100 or by a periodical time frame.

The ISP or cloud service providers may provide a cloud storage service to the users. If the user needs to store files in a place other than in the access device 100 or in the user devices 240, the user may further subscribe the cloud storage service. In order to provide a fast response time, the shared storage module 120 is an ideal memory space for the access device 100 and the user devices 230 which connects with the access device 100.

In one embodiment, access of the shared storage module 120 may be managed by a privileged agent which is a portal of the cloud storage service. Application programs executed by the access device 100 and the user device 230 may store and read data in the shared storage module 120 via the agent if an account name of the cloud storage service and a password are provided as a credential. The agent may be implemented as a piece of system software of the access node 100 which is privileged to use the encryption circuits in the shared storage module 120 and/or in the processor module 110 for accessing the data stored in the shared storage module 120. Other application programs and the OS executed by the processor module 110 cannot visit the shared storage module 120. The only way the other application programs and the OS executed by the processor module 110 accesses the shared storage module 120 is by providing the credential to the agent. Furthermore, in order to guarantee security of the access, direct memory access (DMA) between memory spaces of the agent and the other application programs may be forbidden. All communications must be supervised and examined by the encryption circuits embedded in the processor module 110.

In order to provide data redundancy, two or more access devices 100 are grouped together to provide the cloud storage service. The agents of multiple access devices 100 may implement a peer-to-peer protocol to share data. For example, a copy of a first file stored in a first access device 100 may be distributed to a second access device 100. The first and the second access devices 100 interconnected by the wide-area network 210 have two copies of the first file, respectively. Meanwhile, a copy of a second file stored in the first access device 100 may be distributed to a third access device 100. The first and the third access devices 100 interconnected by the wide-area network 210 have two copies of the second file, respectively.

Preferably but not necessary, the first and the second files are owned by the user of the first access device 100 or the user of the user device 230 which connects to the first access device 100. The second access node 100 and user devices 230 connects to the second access node 100 cannot access the first file stored in the shared storage module 120 of the second access node 100. Similarly, the third access node 100 and user devices 230 connects to the third access node 100 cannot access the second file stored in the shared storage module 120 of the third access node 100.

The number of copies may be increased in order to ensure data safety. In case, if only one copy of a file is attached to the wide-area network 210, the agent which manages the only one copy of the file has to duplicate to another access device 100. For example, in case the second access device 100 is offline or detached the wide-area network, the agent of the first access device 100 has to distribute the first file to another access device 100.

In the discussion above, the unit of duplication is a file which has variable length. However, the unit of duplication may be a fixed sized chunk of data. Moreover, it may be more efficient to "mirror" a fixed size memory space into two or more shared storage modules 120 of distinguished access devices 100. This means values of every data bits in the mirrored memory spaces of the distinguished shared storage modules 120 are identical.

The abovementioned pear-to-pear agent is responsible for keeping track of its partner agents for each file or each chuck of data. However, the agent is run on one single access device 100. If the user device 230 does not directly connect to the access device 100 which runs the agent, it needs to connect to the agent via the wide-area network 210 and the first network module 140 for the cloud storage service. However, it may be not as secure as connecting via the second network module 150 to the agent. Furthermore, when the user device 230 leaves the access device 100, the access device 100 may be turned off or detached from the wide-area network 210. In this case, the user device 230 cannot be served by the so-called cloud storage service. Therefore, in one embodiment, a shared storage server 220 is added to provide the cloud storage service in this case.

Please refer back to FIG. 2, a shared storage server 220 connects to the wide-area network 210. It may be operated by the ISP or cloud service provider. And it may be design in redundancy to decrease service down time. The shared storage server 220 is responsible for keeping track of agents for each file or each chuck of data of each service account. The agents may implement a heart-beating protocol to tell the shared storage server 220 their status. For example, assuming that the credential is provided, when the first access node 100 is turned off and one user device 230 tries to read the first file, the shared storage server 220 is able to inform the agent of the second access device 100 to respond the request of the user device 230. The agent of the second access device 100 may read the copy of the first file and forward it to the user device 230. Furthermore, the shared storage server 220 may find out the first file has only one copy stored in the second access device 100. Hence, the shared storage server 220 may further inform the agent of the second access device 100 to copy the first file to another access device 100.

Since the access node 100 contributes for cloud storage service at the expense of electricity and connectivity bandwidth, the user of the access node 100 may be paid for the contribution. For example, the ISP may reduce the fee of network subscription. Or the cloud service provider may pay for the contribution of providing storage service for other accounts. Besides, the user of the access node 100 and the user devices 230 can enjoy the fastest cloud storage service because the files or data are physically stored in the closest machine. In order to account for the contribution of each access node 100, the shared storage server 220 may have a software module for statistics and billing.

Similar to contribution to the cloud storage service, the access node 100 may also provide an access portal to user devices 230 which do not share the owner of the access node 100. In one embodiment, the access node 100 may provide an access account name and a password to a user device 230 for connecting the second network module 150. It means that the owner of the access device 100 becomes a secondary network service provider who resells connectivity of the wide-area network 210. Once the user device 230 connects the second network module 150, the access node 100 may count the traffic volume or the connection time involving the user device 230. Otherwise, the user device 230 may validate the access account for a fixed time period. The client of the secondary network service provider may pay for the connectivity by utilizing electronic online payment services on the spot. For examples, there already exist many kinds of electronic online payment services such as Google Pay, Samsung Pay, Apple Pay, Alipay, Bitcoin, Pay Pal and etc.

The client may concern about the security and privacy for connecting to the access node 100. Therefore, the data transfer between the first and the second network modules 140 and 150 is under supervision of the encryption circuits of the processor module 110. Alternatively, the data transfers between the first and the second network modules 140 and 150 are undertaken directly without going through the processor module 110 so as the application programs of the access device 100 are isolated from the data transfer. It may also prohibit application programs of the user device 230 directly interacting with the application programs of the access device 100. For examples, the data packets from the user device 230 must be routed out to the wide-area network 210 and back to the application programs of the access device 110.

Please refer back to FIG. 2, a secondary network provider server 225 may be added to the network system 200. The secondary network provider server 225 may be operated by the ISP. Users of the ISP may be registered as resellers at the secondary network provider server 225. The registration may be automatically provisioned by the ISP. The reseller may advertise his/her fee schedule/fare rate and connection information such as available maximum or minimum bandwidth on the secondary network provider server 225. The access nodes 100 of the reseller may be certified by the secondary network provider server 225 to ensure its technical functions is qualified for providing confidential network service.

The client's user device 230 may temporarily connects to the second network module 150 of the access device 100. However, the access device 100 would only allow the client's user device 230 connecting with the secondary network provider server 225. Once the client agrees with the fee schedule, fare rate, and/or maximum or minimum bandwidth advertised by the reseller of the access device 100, the client may pay online through an escrow account of the secondary network provider server 225 to the reseller's account. The access device 100 of the reseller may begin providing data routing service to the client's user device 230 after being informed by the secondary network provider server 225 that the client has agreed the terms of service.

In one embodiment, a secondary network provider agent which works as a client side of the secondary network provider server may be installed and executed at the access device 100. This secondary network provider agent may be configured to count the network traffic volume involving the client's user device 230 and to report to the secondary network provider server 225. In addition, the secondary network provider agent may be configured to enable/disable the services by following the instructions issued by the secondary network provider server 225. However, the secondary network provider agent may not be allowed to "sniff" communications of the client's user device 230.

Alternatively, in other embodiments, the access device 100 may act as the secondary network provider server 225 and the secondary network provider agent as described. A secondary network provider program may be installed in the access device 100. When the client's user device 230 temporarily connects to the second network module 150 of the access device 100, the access device 100 would only allow the client's user device 230 connecting with the secondary network provider program and/or a third party providing online payment function. Once the client agrees with the fee schedule advertised by the reseller of the access device 100, the client may pay online through an escrow account of the third party to the reseller's account or directly to the reseller's account. The access device 100 of the reseller may begin providing data routing service to the client's user device 230 after being informed by the third party that the client has agreed the terms of service and the payment is done.

Similar to the secondary network provider agent, the secondary network provider program may be configured to count the network traffic volume involving the client's user device 230 and to report to the client's user device 230 if being asked. However, the secondary network provider program may not be allowed to "sniff" communications of the client's user device 230.

Figure 3:
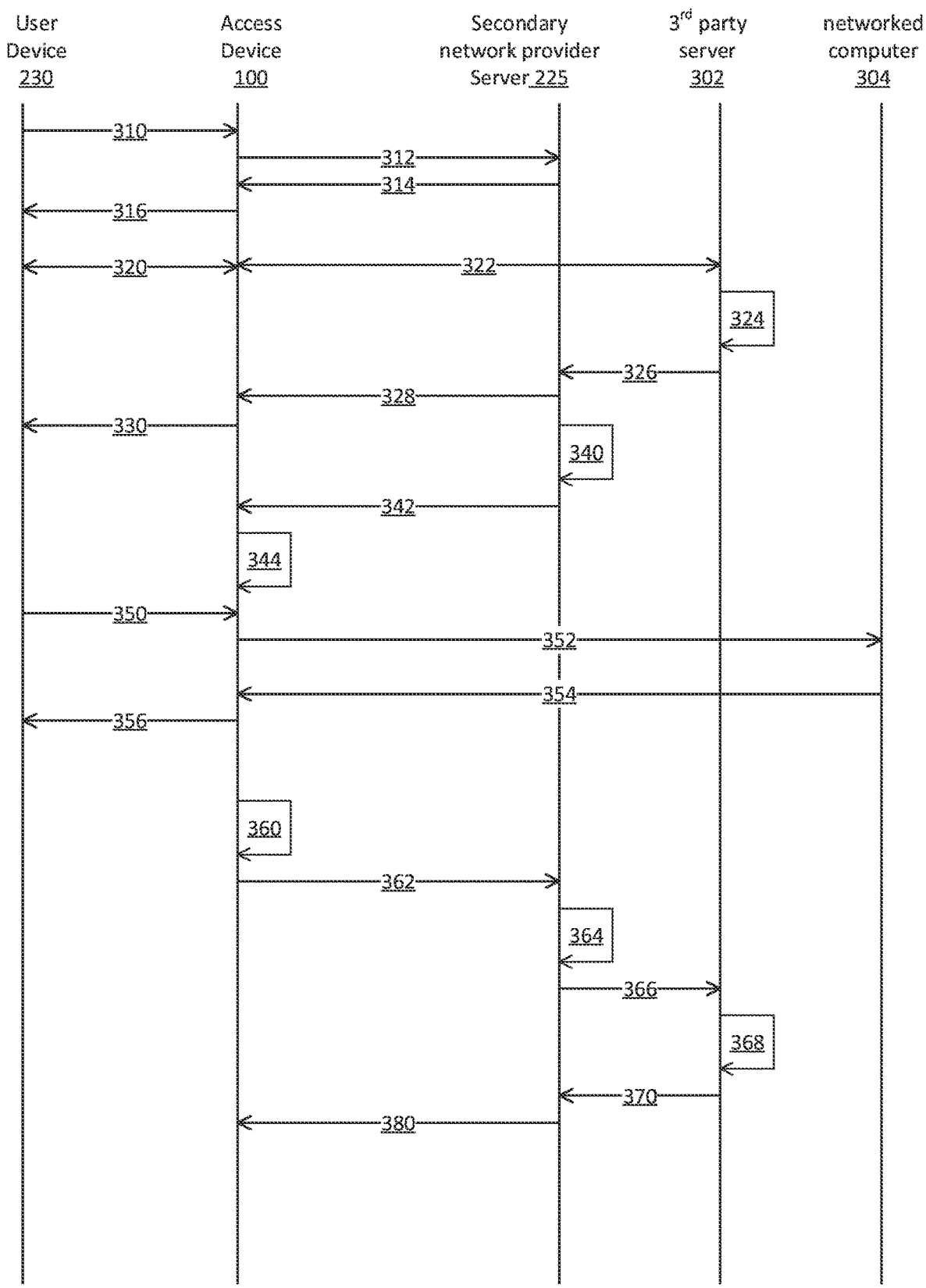
FIG. 3 illustrates an interactive diagram of a secondary network providing method in accordance with an embodiment of the present application.

Please refer to FIG. 3, which illustrates an interactive diagram of a secondary network providing method in accordance with an embodiment of the present application. In this interactive diagram, there are five roles including a client's user device 230, a reseller's access device 100, a secondary network provider server 225, a third party server 302 and any one of networked computers 304. These later four roles are interconnected by the wide-area network 210 or any other network such as Internet. As shown in FIG. 2, the user device 230 may only connect to the second network module 150 of the access device 100. As described above, a secondary network provider agent may be installed in the access device 100 in order to cooperate with the secondary network provider 225.

At the beginning step 310, the client's user device 230 connects to the second network module 150 of the access device 100 and tries to buy the network access service provided by the reseller of the access device 100. The reseller may already has registered an account on the secondary network provider server 225 and advertised the fee schedule. At step 312, utilizing the first network module 140 and the attached wide-area network 210, the access device 100 reaches the secondary network provider server 225 to retrieve the information that the user device 230 requires. At step 314, the information is downloaded to the access device 100. And at step 316, the information is further forwarded to the user device 230.

Next, if the client accepts the terms of service and the fee schedule/fare rate, the user device 230 may reach the $3^{rd}$ party server 302 to pay online. The interactions between the user device 230 and the $3^{rd}$ party server 302 require the intermediation of the access device 100. Therefore the steps 320 and 322 are used to represent the exchanges of information between the user device 230, the access device 100 and the $3^{rd}$ party server 302.

After all necessary information such as credit card information, bank account information collected, the $3^{rd}$ party server 302 may process the online payment at step 324 in order to transfer the client's money to an escrow account of the $3^{rd}$ party or to an account of the reseller. Person having ordinary skill in the art may understand the step 324 may involve multiple banking services. Since it is a well-known step, some of the participating parties are not shown in FIG. 3. After the financial arrangement is done, the secondary network provider server 225 would be notified by the $3^{rd}$ party server 302 at step 326. Accordingly, the secondary network provider server 225 would notify the access device 100 at step 328. And the access device 100 may forward this notification to the client's user device 230 that the network service is available at step 330. If the transfer is not going well, the secondary network provider server 225 would be also notified by the $3^{rd}$ party server 302 at step 326. Accordingly, the secondary network provider server 225 would notify the access device 100 at step 328. And the access device 100 may forward this notification to the client's user device 230 that the network service is not available at step 330.

At step 340, the secondary network provider server 225 may record the reselling as success/failed and other relevant information. In case that the bandwidth of the access device 100 is limited so as only one client's requirement can be met, the secondary network provider server 225 may reject network access request from another user device 230. However, in case that the bandwidth of the access device 100 is large enough, the secondary network provider server 225 may accept second or even third client's request for network access. In one embodiment, the network service request from the user device 230 may indicate the required network bandwidth. The secondary network provider server 225 may accept or reject network service request according to available network bandwidth that the access device 100 can provide. However, the present application does not limit whether the service level provided by the access device 100 can be guaranteed or not.

At step 342, the secondary network provider server 225 may instruct the access device 100 to begin servicing the user device 230. At step 344, the access device 100 may configure its network routing rules to provide the network access to the user device 230. After that, the user device 230 may send information to the networked computer 304 via the access device 100 at step 350. The access device 100 would forward the information to the networked computer 304 by sending it to the first network module 140 and the wide-area network 210. Reversely, the networked computer 304 can also send back information to the user device 230 via the access device 100 at steps 354 and 356. If the access device 100 connects with two or more user devices 230, a routing mechanism is used to distinguish which one of the user devices 230 shall be the receiving party of the information sent from the networked computer 304.

At step 360, once the access device 100 detects the user device 230 is disconnected with the second network module 150, the secondary network provider server 225 may be notified at step 362. Alternatively, the secondary network provider 225 may be notified by the user device 230 that it wants to check out the network access service.

At step 364, the secondary network provider server 225 may do some housekeeping procedures in internal database and may arrange a financial activity being performed by the third party server 302 at step 366. Based on different kinds of commercial terms, the financial arrangement may be done before providing the network access service (e.g. step 324) and/or after the network access service is cut (e.g. step 368). A prepay based term may only need one financial arrangement at step 324. A traffic-counting based term may only need one financial arrangement at step 368. However, other commercial term may require more than one financial arrangement involving the third party server 302.

After the financial arrangement is done at step 368, the secondary network provider server 225 is notified by the third party server 302 at step 370. No matter the financial arrangement is successful or not, the secondary network provider server 225 would update the status of the reseller's account and inform the access device 100 the result of the financial arrangement.

Figure 4:
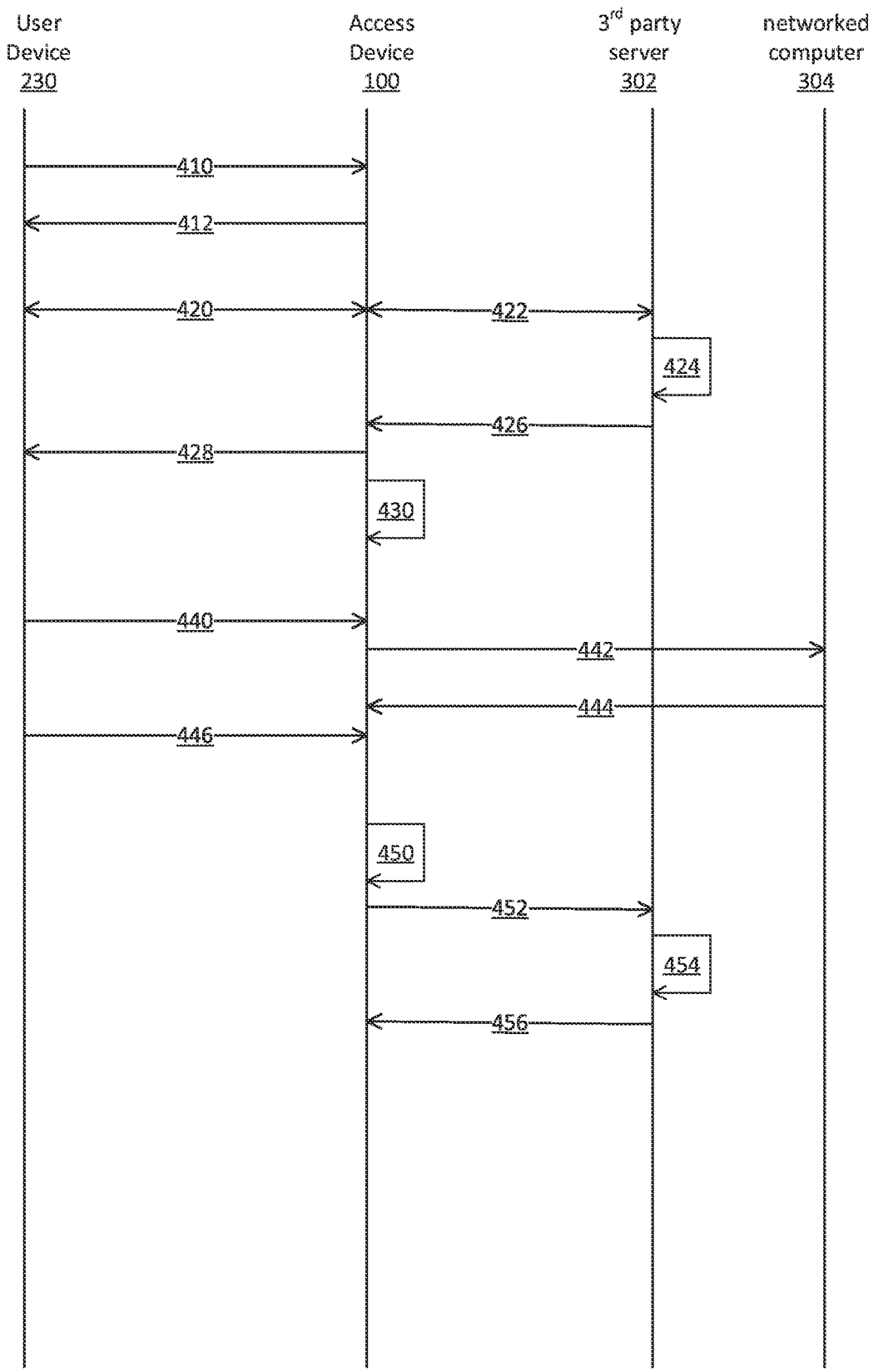
FIG. 4 shows another interactive diagram of a secondary network providing method in accordance with an embodiment of the present application.

Please refer to FIG. 4, which shows another interactive diagram of a secondary network providing method in accordance with an embodiment of the present application. Unlike the embodiment as shown in FIG. 3, there are four roles including a client's user device 230, a reseller's access device 100, a third party server 302 and any one of network computers. The later three roles are interconnected by the wide-area network 210 or any other network such as Internet. As shown in FIG. 2, the user device 230 may only connect to the second network module 150 of the access device 100. As described above, a secondary network provider program may be installed in the access device 100 in order to facilitate the secondary network provider function. After startup of the access device 100, the secondary network provider program may be run at background mode in order to serve the client's request in any moment. The secondary network provider program may be promptly activated by the reseller.

At the beginning step 410, the client's user device 230 connects to the second network module 150 of the access device 100 and tries to buy the network access service provided by the reseller of the access device 100. The reseller may already configure connection information such as fee schedule, fare rate, maximum available bandwidth and/or minimum available bandwidth in the secondary network provider program. And at step 412, the connection information is sent to the user device 230.

Next, if the client accepts the terms of service and the fee schedule/fare rate, the user device 230 may reach the $3^{rd}$ party server 302 to pay online. The interactions between the user device 230 and the $3^{rd}$ party server 302 require the intermediation of the access device 100. Therefore the steps 420 and 422 are used to represent the exchanges of information between the user device 230, the access device 100 and the $3^{rd}$ party server 302.

After all necessary information such as credit card information, bank account information collected, the $3^{rd}$ party server 302 may process the online payment at step 424 in order to transfer the client's money to an escrow account of the $3^{rd}$ party or to an account of the reseller. Person having ordinary skill in the art may understand the step 324 may involve multiple banking services. Since it is a well-known step, some of the participating parties are not shown in FIG. 4. After the financial arrangement is done, the secondary network provider program would be notified by the $3^{rd}$ party server 302 at step 426. And the access device 100 may forward this notification to the client's user device 230 that the network service is available at step 428. If the transfer is not going well, the secondary network provider program would be also notified by the $3^{rd}$ party server 302 at step 426. Accordingly, the secondary network provider program would notify the client's user device 230 that the network service is not available at step 428.

At step 430, the secondary network provider program may record the reselling as success/failed and other relevant information. In case that the bandwidth of the access device 100 is limited so as only one client's requirement can be met, the secondary network provider program may reject network access request from another user device 230. However, in case that the bandwidth of the access device 100 is large enough, the secondary network provider program may accept second or even third client's request for network access. In one embodiment, the network service request from the user device 230 may indicate the required network bandwidth. The secondary network provider program may accept or reject network service request according to available network bandwidth that the access device 100 can provide. However, the present application does not limit whether the service level provided by the access device 100 can be guaranteed or not. Also at this step, the secondary network provider program may configure network routing rules of the access device 100 to provide network access function to the user device 230.

After that, the user device 230 may send information to the networked computer 304 via the access device 100 at step 440. The access device 100 would forward the information to the networked computer 304 by sending it to the first network module 140 and the wide-area network 210 at step 442. Reversely, the networked computer 304 can also send back information to the user device 230 via the access device 100 at steps 444 and 446. If the access device 100 connects with two or more user devices 230, a routing mechanism is used to distinguish which one of the user devices 230 shall be the receiving party of the information sent from the networked computer 304.

At step 450, once the access device 100 detects the user device 230 is disconnected with the second network module 150, the secondary network provider program may be aware. Alternatively, the secondary network program may be notified by the user device 230 that it wants to check out the network access service.

At step 452, the secondary network provider program may do some housekeeping procedures in internal database and may arrange a financial activity being performed by the third party server 302 at step 452. Based on different kinds of commercial terms, the financial arrangement may be done before providing the network access service (e.g. step 424) and/or after the network access service is cut (e.g. step 454). A prepay based term may only need one financial arrangement at step 424. A traffic-counting based term may only need one financial arrangement at step 454. However, other commercial term may require more than one financial arrangement involving the third party server 302.

After the financial arrangement is done at step 454, the secondary network provider program is notified by the third party server 302 at step 456. No matter the financial arrangement is successful or not, the secondary network provider program would update the status of the access device 100 and the result of the financial arrangement.

User device 230 and access device 100 shown in FIGS. 1 and 2 may be used to access a so called social networking service (SNS), e.g., Facebook, Twitter, and Line. One of many functions of the SNS is to provide a mechanism to recommend and to show recommended pieces to users who are interested in the fields. However, the mechanisms are failed to filter out "false" recommendations which may be made by many fake accounts of the SNS. One of the purposes of the present application is to provide a method to prevent fake recommendations.

Figures 5, 6:
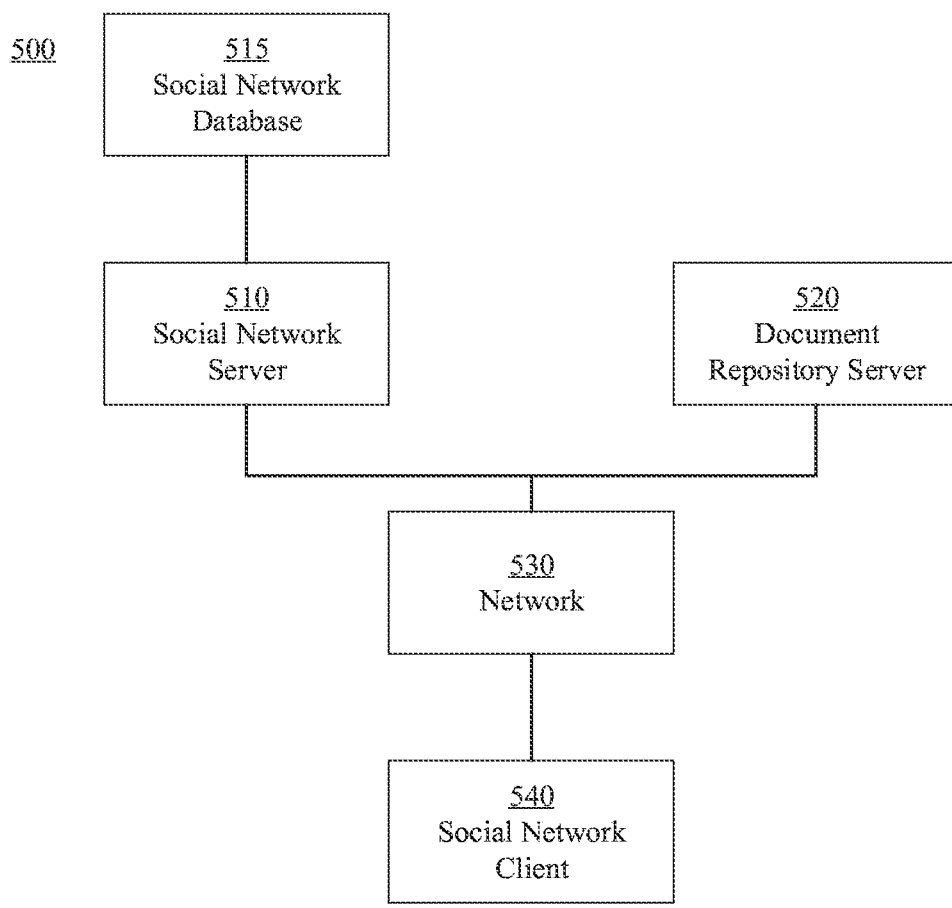
FIG. 5 shows a logical diagram of a social networking service (SNS) 500 in accordance with an embodiment of the present application.
FIG. 6 illustrates a data structure of a document review record in accordance with an embodiment of the present application.

Please refer to FIG. 5, which shows a logical diagram of a social networking service (SNS) 500 in accordance with an embodiment of the present application. The SNS 500 comprises a server side and a client side which are interconnected by a network 530 for transferring information in between. At least a part of the network 530 may be constituted by the wide-area network 210 as shown in FIG. 2. Sometimes, the network 530 may be the Internet.

In one embodiment, the client side may be a social network client 540 which is able to communicate with the server side via the network 530. For example, an application tailored made for the SNS 500 may be installed at the user device 230 and the access device 100 for communicating with the server side. Alternatively, a common use web browser installed the user device 230 and the access device 100 may be used to communicate to the server side by using industrial communication protocols such as HTTP and HTTPS. No matter it is a web browser or a proprietary application, the social network client 540 may present content that the SNS server side sends to a SNS user.

A recommendable or gradable electronic piece is referred as a document hereinafter. A document may be composed of words with designated fonts, pictures, and/or motion pictures which may be displayed by a monitor or a visual display device of the user device 230 or the access device 100. A document may be also composed of audio signals encoded in popular industrial standards such as MP3, MP4, H.263 and H.264. Speaker device of the user device 230 or the access device 100 may be used to play the document with audio signals. In some cases, e.g. an essay or a picture, the entire document can be shown in the visual display device. In some examples, a document may include a plurality of pages or views which cannot be shown simultaneously. Moreover, a document may include minutes of visual and/or audio contents. Audience or reader needs to take time to listen to or read the entire document. The present application provides a mechanism to ensure the audience or the reader providing his/her comments, recommendations and/or grade with regard to the document after the majority of the document is reviewed.

Returning to FIG. 5, the documents stored in a document repository server 520 may be downloaded to the social network client 540 via the network 530. The social network client 540 may keep the entire document or at least a part of the document in its own memory system. For example, a picture may be wholly downloaded and saved in memory system of the social network client 540. A motion picture may be downloaded in stream and only a part of the motion picture is kept in memory system of the social network client 540 in a given moment.

The download of documents may be specified or arranged by the social network server 510. In an instance, a web server of the social network server 510 provides a HTML page to the social network client 540. In this page, a resource link to a specified document and a client-side program such as java script programs are provided. Once a web browser of the social network client 540 interprets the page, the specified document may be viewed in the web browser, embedded viewer plug-in program or associated viewer.

User account and information associated with the user account may be stored in the social network database 515 which can be accessed by the social network server 510. Information associated with the documents may be also stored in the social network database 515. If a user of the SNS is interested in a document, grades, an average grade, comments, or recommendations of the document may be shown to the user. In case the user wants to contribute his/her grade comments, or recommendations regarding to the document, the social network server 510 and the social network client 540 may implement a mechanism to ensure the user already listens to or reads a majority of the document.

Please refer to FIG. 6, which illustrates a data structure of a document review record in accordance with an embodiment of the present application. Although in the data structure as shown in FIG. 6 only comprise five items, person having ordinary skill in the art may understand there may exists more items in the data structure. For example, a creation time and an update time of the data structure may be further included.

In this data structure as shown in FIG. 6, a user UID 610 and a document UID 620 are configured to refer to a user and a document, respectively. Unique identification number or string may be used to identify the user and the document which is being graded by the user.

If the document can be displayed in one screen, there is only one display flag 630 to denote whether it is displayed or not in the social network client 540. In case that the document cannot be displayed in one screen, the document may be separately viewed in N pages, where N is a natural number larger than 1. For each page, there is an associated display flags 630 to denote whether the associated page is displayed in the social network client 540. Similarly, each page is associated with a display time duration item 640 which is used to denote how much time the page is displayed. For example, a page may include 300 words. An ordinary people may take 30 seconds to read a page. If the user flips a page in one second, it can be determined that the user just skip this page without serious reading. The corresponding display flag 630 may be de-asserted in this circumstance.

In one embodiment, documents with motion pictures or sounds may be divided in several pieces. Each piece of document is associated with a play flag 630 and a play time duration 640. For example, a motion picture may be divided into several pieces where each piece contains 10 seconds of content. If the social network client 540 plays the piece fast forwardly, the piece may be played only in 2 seconds. The corresponding play flag 630 may be not asserted given the piece is not played more than a portion of normal time duration. The portion may be 70%, 80% or 90%.

At last, a document grade and/or comments item may be used to denote the user's opinion. The grade may be just a thumb up or a thumb down. Or the grade may be a 1 to 5 stars evaluation. In some cases, the grade may be in a more complicated form. And the grades of the document may be averaged to show a percentage of users who did review and like/dislike the document. In some embodiments, a comment of a document may be viewed as another document which may be graded furthermore.

Data recoded in the data structure as shown in FIG. 6 may be permanently stored in the social network database 515 by the social network server 510. The items in the data structure may be recorded in the social network server 510 and/or the social network client 540. For examples, the flags 630 and the time durations 640 may be firstly recorded by the social network client 540 when the document being displayed or played. Afterward, the recorded flags 630 and the time durations 640 are posted to the social network server 510. Once the social network server 510 decides that the flags and time durations 640 do show the user read or listened to the document properly, the document grade and/or comments item 640 may be available for the user. Alternatively, it may be up to the social network client 540 to determine whether the user read or listened to the document properly. Thus, the social network client 540 may unlock the document grade and/or comments item 640 to the user for writing.

The aforementioned business intelligence performed in the social network client 540 may be provided by the page, e.g., java script programs, downloaded from the social network server 510. In other words, the client-side programs may be provided by the social network server 510. However, in alternative embodiments, the social network client 540 may embody the business intelligence already. In this case, since the social network client 540 can determine whether the user properly reviews the document, the social network client 540 is able to let qualified user to leave his/her grade and/or comment and to upload the document grade and/or comment 650 of the qualified user. So the flags 630 and the time durations 640 are kept in the social network client 540 only. The social network database 515 does not need to store these flags 630 and the time durations 640.

According to an embodiment of the present application, an access device 100 is provided, The access device comprising: a first network module 140, configured for connecting to a wide-area network 210; a second network module 150, configured for connecting a user device 230 in a local area with the access device 100; and a processor module 110, coupled to the first and the second network modules 140 and 150, configured for executing instructions stored in a non-volatile memory to realize following steps: having the user device 230 connecting to a third party server 302 via the wide-area network for making a first online financial arrangement with an electronic account of an owner of the access device 100; and having the user device 230 connecting to a networked computer 304 via the wide-area network 210 after the first online financial arrangement is successfully done.

Preferably, in order to provide advertisement of terms of service in advanced, the processor module 110 is further configured to realize following steps: having the user device 230 connecting to a secondary network provider server 215 via the wide-area network 210 to download terms of network service that the access device 100 provides to the user device 230, wherein the user device 230 connecting to the networked computer 304 according to the terms of network service, wherein the terms of network service comprises at least one of following: a maximum bandwidth that the first network module 140 assigns to the user device 230; and a minimum bandwidth that the first network module 140 assigns to the user device 230.

Preferably, in order to provide secondary network services to multiple user devices, when the second network module 150 is further configured for connecting a second user device 230 in the local area with the access device 100, the processor module 110 is further configured to realize following steps: having the second user device 230 connecting to the third party server 302 via the wide-area network 210 for making a second online financial arrangement with the electronic account of an owner of the access device 100; and having the second user device 230 connecting to a second networked computer 304 via the wide-area network 210 after the second online financial arrangement is successfully done.

Preferably, in order to provide secondary network services by mobile portable devices such as smartphones, the access device 100 further comprises: a battery, configured for solely supplying power to the first network module 140, the second network module 150 and the processor module 110, wherein the wide-area network 210 is a wireless telecommunication mobile network (e.g. 3G, 4G, 5G or even 6G standards defined by 3GPP), wherein the second network module 150 is configured to connecting the user device 230 according to IEEE 802.11 series of standards (e.g., Wi-Fi).

Preferably, in order to provide fare charging by network traffics, the processor module 110 is further configured to realize following steps: after the user device 230 disconnects with the second network module 150, connecting to the third party server 302 via the wide-area network 210 for making a third online financial arrangement with the electronic account of the owner of the access device 100.

Preferably, in order to provide network security and privacy to any given user device 230, the processor module 110 comprises encryption circuits to encrypt signals to and from the first network module 140 and the second network module 150. Thus no other programs executed by the processor module 110 may sniff the traffics involving the user device 230.

Preferably, in order to provide network security and privacy to any given user device 230, the first and the second network modules 140 and 150 are directly connected so as that data exchanges between the user device 230 and the networked computer 304 do not pass through the processor module 110. Thus, this is another way to prevent other programs executed by the processor module 110 from sniffing the traffics involving the user device 230.

Preferably, in order to provide fast and redundant data storage cloud service, the access device 100 further comprises: a shared storage module 120, configured for storing a copy of data sent from the access device 100, wherein the processor module 110 is further configured to realize following steps: sending the data to a second access device 100 attached to the wide-area network 210 so as a second shared storage module 120 of the second access device 100 is instructed for storing another copy of the data. The data may come from the access device 100 or the user device 230.

Preferably, in order to provide more redundancy for different files or data, when the shared storage module 120 is further configured for storing a copy of second data sent from the access device 100, the processor module 110 is further configured to realize following steps: sending the second data to a third access device 100 attached to the wide-area network 210 so as a third shared storage module 120 of the third access device 100 is instructed for storing another copy of the second data.

Preferably, in order to provide redundancy of the storage cloud service, the processor module 110 is further configured to realize following steps: after being notified that the second access device 100 is detached from the wide-area network 210, sending the data to a fourth access device 100 attached to the wide-area network 210 so as a fourth shared storage module 120 of the fourth access device 100 is instructed for storing another copy of the data.

Preferably, in order to provide redundancy of the storage cloud service, the processor module 110 is further configured to realize following steps: after being instructed to store a copy of fifth data sent from a fifth access device 100 attached to the wide-area network 210, receiving and storing the copy of fifth data sent from the fifth access device 100 in the shared storage module 120.

Preferably, in order to provide data privacy and security, the shared storage module 120 comprises encrypted circuits for encrypting and decrypting the data.

Preferably, in order to provide data privacy and security, the shared storage module 120 comprises exact one interface which is physically hardwired to the processor module 110. Thus no data access to the shared storage module 120 can bypass the processor module 110. And the hardwired connections may make sure that the shared storage module being damaged if it is retrieved from the access device 110.

Preferably, in order to provide data privacy and security, the processor module 110 comprises encrypted circuits for encrypting and decrypting data being stored in the shared storage module 120.

Preferably, in order to provide storage cloud service without using precious radio frequency resources, the first network module 140 is configured for connecting to the wide-area network 210 using a fixed line interface. The fixed line interface may be compliant to an optical fiber interface, a digital subscriber line (DSL) interface, a coaxial cable interface and any other line interfaces.

Preferably, in order to provide a grade of a document after a user really review this document, the access device 100 further comprises an output device and a input device coupled to the processor module 110, wherein the processor module 110 is further configured to realize following steps: downloading, by the first network module 140, a document which contains multiple pieces from a document repository server 520 via the wide-area network 210 or 530; outputting the multiple pieces of the document by the output device and recording time durations corresponding to each of the pieces; determining whether the multiple pieces are properly reviewed according to the time durations, respectively, to assert multiple flags corresponding to the multiple pieces; determining whether the document is properly reviewed according to the multiple flags; when it is determined that the document is properly reviewed, receiving a grade of the document by the input device; and uploading, by the first network module, the grade of the document to a social network server 510 via the wide-area network 210 or 530. The output device may comprise a display device or a speaker device for visual or acoustic outputs.

Preferably, in order to provide a grade of a document after a user really review this document, the user device 230 further comprises an output device and a input device, wherein the user device 230 is further configured to realize following steps after the first online financial arrangement is successfully done: downloading a document which contains multiple pieces from a document repository server 520 via the access device 100 and wide-area network 210; outputting the multiple pages of the document by the output device and recording time durations corresponding to each of the pieces; determining whether the multiple pieces are properly reviewed according to the time durations, respectively, to assert multiple flags corresponding to the multiple pieces; determining whether the document is properly reviewed according to the multiple flags; when it is determined that the document is properly reviewed, receiving a grade of the document by the input device; and uploading the grade of the document to a social network server 510 via the access device 100 and the wide-area network 210.

Preferably, in order to provide a grade of a streaming document after a user really review this document, the downloading of the document from the document repository server 520 is via a streaming protocol.

According to an embodiment of the present application, a system 200 comprising the aforementioned user device 230 and the aforementioned access device 100 is provided.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An access device for providing a network connection to a user device, comprising:
a first shared storage;
a first network interface circuit for connecting to a wide-area network;
a second network interface circuit for connecting the user device in a local area with the access device; and
a processor to the first network interface circuit and the second network interface circuit;
wherein the user device connects to a third party server for authentication and making a first online financial arrangement with an electronic account of an owner of the access device; and
wherein the user device connects to the wide-area network via said access device after the first online financial arrangement is successfully done;
wherein the first network interface circuit downloads a document containing multiple pieces from a document repository server via the wide-area network to the user device;
wherein the user device outputs each of the multiple pieces of the document and records time durations corresponding to each of the multiple pieces, and determines whether each of the multiple pieces are properly reviewed according to the corresponding time durations, respectively, and asserts multiple flags corresponding to the multiple pieces, each of the multiple flags serving as display flags denoting whether the corresponding multiple pieces are displayed for at least a predetermined portion of the corresponding time duration and reviewed in the user device;

wherein the access device determines whether the document is properly reviewed according to the multiple flags, and the input device receives a grade of the document indicating an assigned rating when the document is properly reviewed; and wherein the first network interface circuit uploads the grade of the document to a social network server via the wide-area network.

2. The access device as claimed in claim 1, wherein the user device connects to the third party server for authentication and making the first online financial arrangement via a limited access to the access device.

3. The access device as claimed in claim 2, wherein the user device downloads terms of network service provided by the access device, and the user device connects to the access device according to the terms of network service, and the terms of network service comprises a maximum bandwidth assigned to the user device or a minimum bandwidth assigned to the user device.

4. The access device as claimed in claim 1, wherein the first user device further accesses the first shared storage after the first online financial arrangement is successfully done.

5. The access device as claimed in claim 1, wherein a second user device connects to the third party server via the wide-area network for making a second online financial arrangement with the electronic account of an owner of the access device, and the second user device accesses the first shared storage after the second online financial arrangement is successfully done.

6. The access device as claimed in claim 5, wherein the first share storage stores a first copy of data sent from second user device, and the second network interface circuit sends the data to a second shared storage via the wide-area network for storing a second copy of the data.

7. The access device as claimed in claim 6, wherein after being notified that the second shared storage is detached from the wide-area network, the second network interface circuit sends the data to a third storage device attached to the wide-area network for storing another copy of the data.

8. The access device as claimed in claim 5, wherein the first share storage receives a copy of data sent from a second shared storage via the wide-area network for storing a second copy of the data.

9. The access device as claimed in claim 1, wherein the processor comprises encryption circuits to encrypt signals between the first network interface circuit and the second network interface circuit.

10. The access device as claimed in claim 1, wherein the first network interface circuit and the second network interface circuit are directly connected, and data exchanges between the user device and the wide-area network do not pass through the processor.

11. The access device as claimed in claim 1, wherein the first shared storage comprises encrypted circuits for data encryption and data decryption data.

12. The access device as claimed in claim 1, wherein the processor comprises encrypted circuits for encrypting and decrypting data being stored in the first shared storage.

13. The access device as claimed in claim 1, wherein the first network interface circuit downloads the document containing multiple pieces from the document repository server via the wide-area network upon the first online financial arrangement is successfully done.

14. The access device as claimed in claim 1, wherein the document is downloaded from the document repository server via a streaming protocol.

15. The access device as claimed in claim 1, wherein the access device is a cellular phone.

16. The access device as claimed in claim 1, wherein the access device is a network router.

17. The access device as claimed in claim 1, wherein user device additionally asserts the time durations corresponding to each of the pieces of the document along with the multiple flags, denoting whether the multiple pieces of the document are properly reviewed according to the time durations, respectively, to determine the document is properly reviewed prior to uploading the grade of the document to the social network server.

18. The access device as claimed in claim 1, wherein the access device employs a peer-to-peer protocol to share the document and the multiple pieces of the document to multiple user devices connected to the access device.

* * * * *